(12) United States Patent
Lecat

(10) Patent No.: US 9,064,428 B2
(45) Date of Patent: Jun. 23, 2015

(54) AUSCULTATION TRAINING DEVICE AND RELATED METHODS

(71) Applicant: Paul Jacques Charles Lecat, Tallmadge, OH (US)

(72) Inventor: Paul Jacques Charles Lecat, Tallmadge, OH (US)

( * ) Notice: Subject to any disclaimer, the term of this patent is extended or adjusted under 35 U.S.C. 154(b) by 48 days.

(21) Appl. No.: 13/755,996

(22) Filed: Jan. 31, 2013

(65) Prior Publication Data

US 2013/0196302 A1     Aug. 1, 2013

Related U.S. Application Data

(60) Provisional application No. 61/592,628, filed on Jan. 31, 2012.

(51) Int. Cl.
     *G09B 23/28*      (2006.01)
     *G09B 23/30*      (2006.01)
     *G09B 23/00*      (2006.01)

(52) U.S. Cl.
     CPC ............... *G09B 23/28* (2013.01); *G09B 23/00* (2013.01); *G09B 23/30* (2013.01)

(58) Field of Classification Search
     CPC ......... G09B 23/00; G09B 23/28; G09B 23/30
     USPC ....................................................... 434/266
     See application file for complete search history.

(56) References Cited

U.S. PATENT DOCUMENTS

| | | | | |
|---|---|---|---|---|
| 4,141,066 A * | 2/1979 | Keiles | ............................. | 700/81 |
| 6,503,087 B1 * | 1/2003 | Eggert et al. | ................. | 434/262 |
| 2010/0062407 A1 * | 3/2010 | Lecat | ............................. | 434/262 |
| 2010/0279262 A1 * | 11/2010 | Lecat | ............................. | 434/266 |
| 2013/0252219 A1 * | 9/2013 | Lecat | ............................. | 434/266 |
| 2014/0087343 A1 * | 3/2014 | Lecat | ............................. | 434/266 |

FOREIGN PATENT DOCUMENTS

JP      2005227534 A      8/2005

OTHER PUBLICATIONS

"The Basics of RFID Technology," B. Violino, http://www.rfidjournal.com/articles/view?1337, RFID Journal, Jan. 16, 2005.*
"A Proposed Classification of Simulators," Pott et al., Middle East Journal of Anesthesiology 20 (2), 2009, pp. 179-185.*
"Piggyback Fuel Controllers," Innovate Motorsports, https://web.archive.org/web/20041029213614/http://www.in-novatemotorsports.com/resources/piggy-back.php, Oct. 29, 2004.*
International_Search_Report_and_Written_Opinion_for_PCTUS2013024183 (Corresponding International Application).

* cited by examiner

*Primary Examiner* — Sam Yao
*Assistant Examiner* — Jennifer L Fassett
(74) *Attorney, Agent, or Firm* — Emerson Thomson Bennett, LLC; Roger D. Emerson; Sergey Vernyuk

(57) ABSTRACT

An auscultation system may include an auscultation device, a simulation unit, a speaker and a proximity sensor that detects the proximity of the auscultation device and emits a signal in response. The auscultation system may also include a database storing multiple sound files and a controller. The controller may receive the signal, select one of the sound files and transmit the selected sound file to the speaker in response to the signal. In one embodiment, the simulation unit is attached to a live subject. In another embodiment, the simulation unit is attached to a mannequin.

14 Claims, 3 Drawing Sheets

AUSCULTATION TRAINING DEVICE AND RELATED METHODS

CROSS-REFERENCE TO RELATED APPLICATIONS

This application claims the benefit of U.S. Provisional Patent Application Ser. No. 61/592,628 for an AUSCULTATION TRAINING DEVICE AND RELATED METHODS, filed on Jan. 31, 2012, which is hereby incorporated by reference in its entirety.

BACKGROUND OF THE INVENTION

1. Field of the Invention

The invention relates to devices, methods, and systems relating to auscultation training.

2. Description of Related Prior Art

Auscultation is the act of listening to sounds within the body as a method of diagnosis. A stethoscope is an example of an auscultation device that is used in the medical field to listen to internal sounds in the human body, such as for example heart sounds, breathing (breath sounds), intestinal noises, and blood flow in arteries and veins. Acoustic stethoscopes operate on the transmission of sound from a headpiece, via air-filled hollow tubes, to a listener's ears. The headpiece may include a diaphragm that can be placed against a human body for sensing sound. Body sounds vibrate the diaphragm, creating acoustic pressure waves that travel through the tubing to the listener's ears.

Using a stethoscope or other auscultation device to diagnose a patient requires training in detecting and identifying abnormal sounds. Standardized patients are a valuable training tool in medical education and have been extensively researched. Though standardized patients give students one-on-one interaction with real human subjects, most standardized patients do not present abnormal symptoms. As a result, simulation units and mannequins are often used to train or test students on auscultation devices, such as stethoscopes. Auscultation training mannequins may include a sound generating device embedded within the body of the mannequin to produce sounds consistent with an abnormal physical condition, which students must detect and identify.

SUMMARY OF THE INVENTION

In summary, the invention is an auscultation system. The auscultation system includes an auscultation device. The auscultation system also includes a mannequin having at least one embedded speaker. The auscultation system also includes a proximity device embedded within the mannequin and operable to detect the proximity of the auscultation device. The proximity device can also emit a signal in response to detection of the auscultation device. The auscultation system also includes a first database storing a plurality of sound files. The auscultation system also includes a first controller operable to communicate with the proximity device and receive the signal. The first controller is also operable to select one of the sound files and transmit the selected sound file to the at least one speaker in response to receipt of the signal from the proximity device. The auscultation system also includes a second controller operable to override the first controller.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENT

The present invention generally relates to systems for auscultation training and methods associated with such systems. Auscultation mannequins incorporating speakers are known, such as disclosed in U.S. Pat. No. 3,564,729. Embodiments of the invention can be practiced as a kit which modifies the operation of existing auscultation mannequins incorporating speakers. Speakers in mannequins, such as speakers 21 shown in U.S. Pat. No. 3,564,729, can receive signals corresponding to sounds through a hard wire connection or wirelessly. A controller would control the transmission of signals to the speakers.

Figure 1:
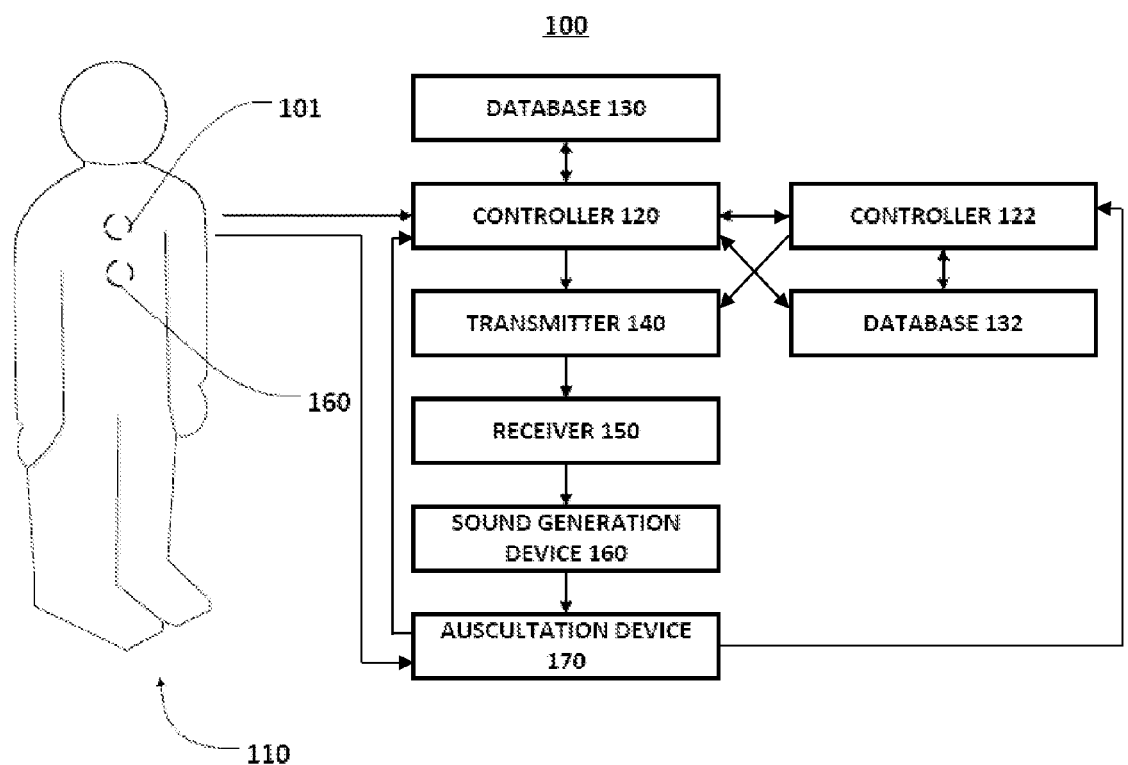
FIG. 1 is a schematic diagram showing an embodiment of the invention.

FIG. 1 is a schematic diagram showing an embodiment 100 of the invention. The embodiment 100 includes a mannequin 110 fitted with at least one proximity sensor 101 for detecting the relative position of an auscultation device 170. The proximity sensor 101, shown in dash line since it is embedded within the mannequin 110, communicates proximity data to a controller 120. The proximity sensor 101 may be of any type, including, but not limited to, capacitive, inductive, magnetic, passive-optical, barcode, infrared, photocell, radar, sonar, ultrasonic, RFID, laser, Eddy-current, or Doppler effect.

Controller 120 determines the position of the auscultation device 170 relative to mannequin 110, and thus determines which sound, or class of sounds, is appropriate for transmission. For instance, if the auscultation device 170 is found to be proximal to a heart region, then an appropriate sound may be one or more heart sounds. Accordingly, controller 120 selects an appropriate sound file from database 130 and retrieves the selected sound file. The controller 120 then communicates the sound file to a transmitter 140, which wirelessly broadcasts the sound file according to a predetermined protocol. The broadcast signal is received by receiver 150 and communicated to a sound generation device 160, such as a speaker embedded in the mannequin 110. The sound generation device 160 communicates an acoustic wave through an auscultation device 170, which audibly delivers the acoustic wave to a listener. It is noted that sounds that are generated could be synchronized with the EKG, breathing, pulses, and any of the other mannequin functions. Alternatively, the sound generation device 160 may be located on the auscultation device 170 and audibly deliver the acoustic wave to a listener.

In an embodiment of the invention, an additional controller 122 can be included to override previously implemented control logic applied by the controller 120. Thus, an embodiment of the invention can define an after-market modification or kit to an existing auscultation mannequin 110 that incorporates speakers 160 and is controlled by a controller 120. The speakers 160 can be imbedded in the mannequin 110. An embodiment of the invention can include the controller 122 which is operable to modify the logic and/or code of the controller 120. As a result, an embodiment of the invention can bypass the "native system" of an existing auscultation mannequin 110. A basis for bypassing the native system can be a break-down of the native system or if it is desired to emit new, different sounds than the mannequin 110 could previously generate.

The controller 122 can control the controller 120 in several different ways in one or more embodiments of the invention. The controller 122 can control the controller 120 to deviate from prior programming to play a sound different from the sound called for by original programming. The controller 122 can also control the controller 120 to search for sound files in a database different from the previously-existing database 130, such as database 132. The controller 120 can communicate directly with the database 132 or can communicate with the database 132 through the controller 122. The controller 122 can also control the controller 120 to transfer sound files from the database 132 and store those files in the database 130.

It is noted that after an embodiment of the invention has been operated, the sound generating devices 160 can again be controlled by the original controller 120. Embodiments of the invention will not destructively engage the existing system such that the device cannot return to its original condition.

It is also noted that the embodiments of the invention described above can be practiced with an auscultation training device sold under the trademark VENTRILOSCOPE®, as set forth in U.S. Pub. No. 2009/0117527. The VENTRILOSCOPE® receiver could have an output jack to a speaker or recording device.

Figure 2:
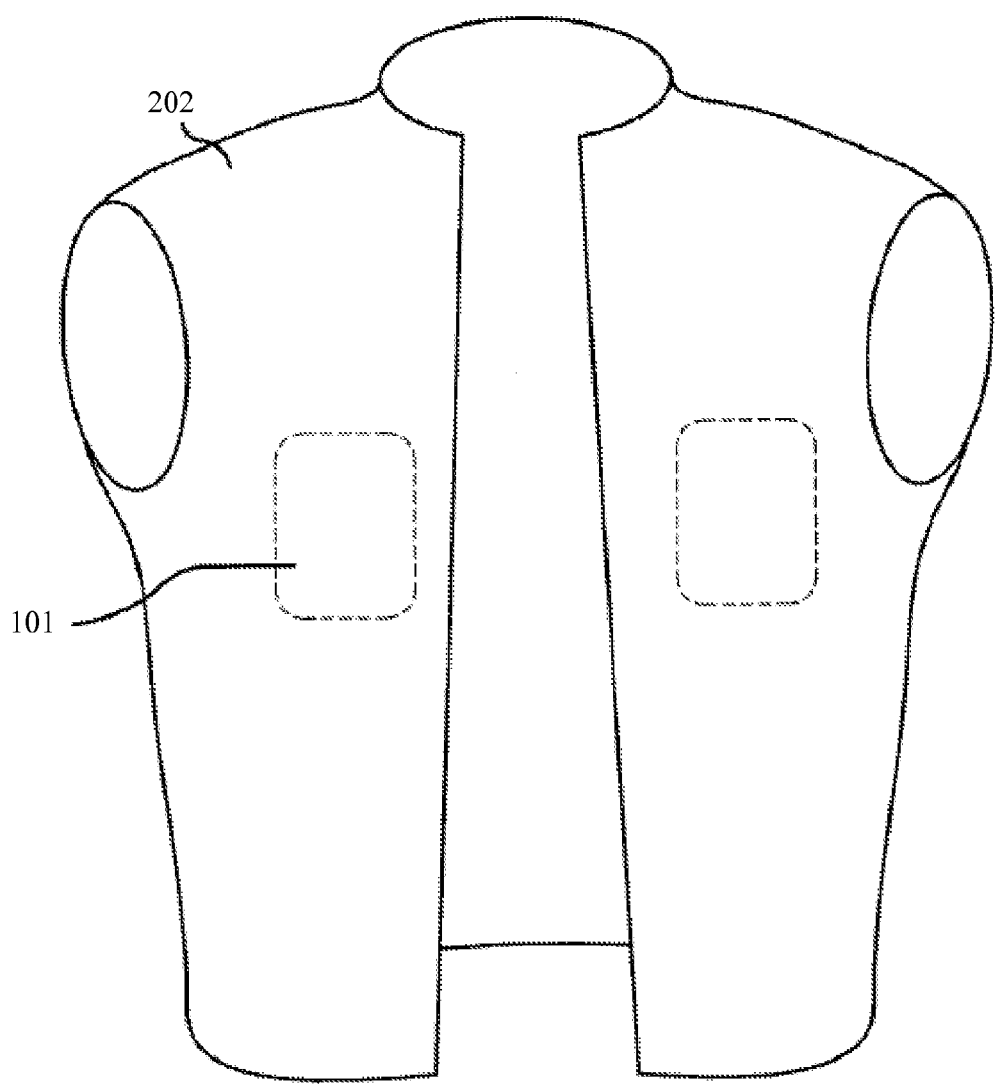
FIG. 2 shows an embodiment of the invention with a vest.

FIG. 2 shows an alternative embodiment 200 of the invention with a vest 202. In an alternative embodiment 200, the proximity sensor 101 may be embedded within an article of clothing 202 that may be worn by a live human. The sound generating device 160 may be embedded within the article of clothing 202, or it may be located on the auscultation device 170. The article of clothing 202 can include, but is not limited to, a sock, stocking, girdle, shirt, vest, sweater, pants, shorts, hat, mitten, glove, belt, or tie. All other features and characteristics may be as in the embodiment 100 of FIG. 1.

Figure 3:
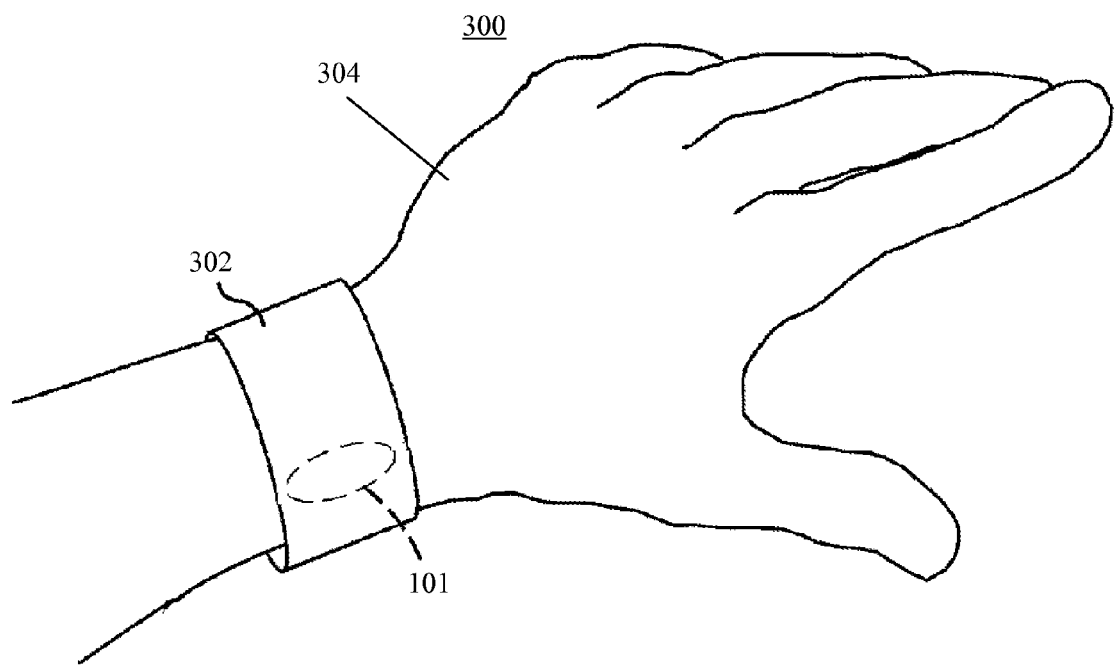
FIG. 3 shows an embodiment of the invention with a band on a wrist.

FIG. 3 shows an alternative embodiment 300 of the invention with a band 302 on a human wrist 304. In an alternative embodiment 300, the proximity sensor 101 may be embedded within a mounting structure 302 that may be attached, secured, affixed, or mounted on a human 304 or a mannequin 110. The sound generating device 160 may be embedded within the mounting structure 302, or it may be located on the auscultation device 170. The mounting structure 302 can include, but is not limited to, a sleeve, an adhesive sheet, a strap, a band, a harness, or a tether. All other features and characteristics may be as in the embodiment 100 of FIG. 1.

It is also noted that any of a wide variety of wireless communications means can be appropriate for data and/or control signal transmission. For instance, some appropriate means can include radio or infrared communications means. More specifically, some appropriate protocols include, without limitation the wireless local area networking protocol used by devices certified under the certification mark WI-FI®, the telecommunication and computer protocol used by devices certified under the certification mark BLUETOOTH®, the wireless communication protocol used by devices sold under the trademark ZIGBEE®, and the like. Similarly, any of a wide range of hardwired connections can be appropriate. Some such connections include, without limitation, serial bus, parallel bus, SCSI, I2C (inter-integrated circuit), SPI (serial peripheral interface), and the like or any combination thereof. One of skill in the art will recognize that a wide range of wireless and hardwire technologies are available, and will be able to select an appropriate technology without undue experimentation.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. An auscultation system comprising:
   a simulation unit comprising a mannequin;
   at least one speaker;
   a first proximity sensor embedded within the mannequin;
   an auscultation device operable to ascertain when the auscultation device is in proximity to the first proximity sensor;
   a first database storing a plurality of sound files;
   a first controller operable to:
   (1) receive a communication from the auscultation device to the first controller that the auscultation device is in proximity to the first proximity sensor;
   (2) select one of the sound files; and
   (3) transmit the one of the sound files to the at least one speaker in response to receipt of the communication from the auscultation device to the first controller that the auscultation device is in proximity to the first proximity sensor; and
   a second controller, remote from the first controller, operable to: (1) receive a communication from the auscultation device to the second controller that the auscultation device is in proximity to the first proximity sensor; (2) override the first controller; and (3) control the first controller to select a sound to be transmitted to the at least one speaker in response to the communication from the auscultation device to the second controller that the auscultation device is in proximity to the first proximity sensor.

2. The auscultation system of claim 1 wherein the first controller is embedded within the mannequin.

3. The auscultation system of claim 1 wherein the at least one speaker is embedded within the mannequin.

4. The auscultation system of claim 1 wherein the second controller selects the sound to be transmitted by controlling the first controller to select one of the sound files from the first database.

5. The auscultation system of claim 1 further comprising:
   a second database, remote from the first database, storing a plurality of sound files, wherein the second controller selects the sound to be transmitted by controlling the first controller to select one of the plurality of sound files from the second database.

6. The auscultation system of claim 5 wherein the second controller is further operable to control the first controller to transfer at least one of the sound files from the second database to the first database.

7. A method for simulating auscultation comprising the steps of:
   a) providing:
   a simulation unit comprising a mannequin;
   a first proximity sensor embedded within the mannequin;

at least one speaker;
an auscultation device operable to ascertain when the auscultation device is in proximity to the first proximity sensor;
a first database storing a plurality of sound files;
a first controller configured to:
(1) select one of the sound files from the first database in response to a communication from the auscultation device to the first controller that the auscultation device is in proximity to the first proximity sensor, and
(2) transmit the selected one of the sound files to the at least one speaker; and
a second controller remote from the first controller;
b) activating the second controller to override the first controller;
c) a user bringing the auscultation device in proximity to the first proximity sensor;
d) the auscultation device ascertaining that it is in proximity to the first proximity sensor;
e) the auscultation device communicating to the first controller and the second controller that the auscultation device is in proximity to the first proximity sensor;
f) the second controller overriding the first controller;
g) the second controller selecting a sound in response to the communication from the auscultation device to the second controller that the auscultation device is in proximity to the first proximity sensor by controlling the first controller to select the sound; and
h) the second controller transmitting the sound selected by the second controller to the at least one speaker or the second controller controlling the first controller to transmit the sound selected by the second controller to the at least one speaker.

8. The method of claim 7 wherein the at least one speaker provided in step a) is embedded within the mannequin.

9. The method of claim 7 wherein the first controller provided in step a) is embedded within the mannequin.

10. The method of claim 7 wherein the second controller selects the sound in step g) by controlling the first controller to select one of the sound files from the first database.

11. The method of claim 7 further comprising the steps of:
j) deactivating the second controller;
k) the second controller ceasing to override the first controller;
l) the first controller selecting one of the plurality of sound files from the first database in response to the communication from the auscultation device to the first controller that the auscultation device is in proximity to the first proximity sensor; and
m) the first controller transmitting the selected sound file to the at least one speaker; wherein steps j)-m) are performed after step h).

12. The method of claim 7 wherein step a) further comprises providing:
a second database, remote from the first database, storing a plurality of sound files wherein the sound selected in step g) is selected from the plurality of sound files stored in the second database.

13. The method of claim 12 wherein in step h), the second controller controls the first controller to transmit the selected sound selected by the second controller to the at least one speaker.

14. The method of claim 12 further comprising the step of:
i) the second controller controlling the first controller to transfer at least one of the sound files from the second database to the first database.

* * * * *